INVENTORS
CARL BOSCH
IRWIN FREDRICKS
BY Borst & Borst
ATTORNEYS

INVENTORS
CARL BOSCH
IRWIN FREDRICKS
BY Borst & Borst
ATTORNEYS

United States Patent Office
3,081,433
Patented Mar. 12, 1963

3,081,433

TWO-STAGE FREQUENCY DETECTING DEVICE EMPLOYING A RADIATION SENSITIVE INPUT MEANS

Carl Bosch, New York, and Irwin Fredricks, Flushing, N.Y., assignors to Sperry Rand Corporation, Ford Instrument Company Division, Wilmington, Del., a corporation of Delaware Filed Dec. 7, 1960, Ser. No. 74,411
4 Claims. (Cl. 325—364)

This invention relates to frequency detection systems and particularly to frequency detectors designed for high sensitivity to radiation appearing at its input.

According to the invention, the frequency detection system makes use of sinusoidal oscillators arranged in a two-stage circuit with the first stage designed to produce a fairly high difference or beat frequency and the second stage designed to yield a zero beat frequency in normal operation and a low cycle frequency when a radiation signal is applied to the input of the first stage. The low frequency present in the second stage is adapted for audio amplification and indication.

More specifically, the high frequency output of the first stage of the instant frequency detecting system is produced by mixing the output of a reference oscillator and a measuring oscillator, the frequency of the latter being controlled by a radiation sensor, the normal frequencies of the two oscillators in this stage being set sufficiently apart so that the possibility of frequency interlocking is removed. As mentioned, the two oscillators are adapted to yield sinusoidal frequencies thereby obviating the need for multivibrators which have inherent instability. A second mixer in the second stage of the frequency detector is arranged to mix a higher frequency harmonic of the beat frequency output of the first stage with the output of a harmonic frequency oscillator to produce a zero beat or a low difference frequency in the presence of radiation.

One object of the invention is to provide a two-stage frequency detecting device of an improved design.

Another object of the invention is to provide a two-stage, highly sensitive frequency detection system using in the first stage, multiple high frequency oscillators which are adapted to produce sine wave frequencies and which are set to yield these frequencies at substantially different ranges.

Figure 1:
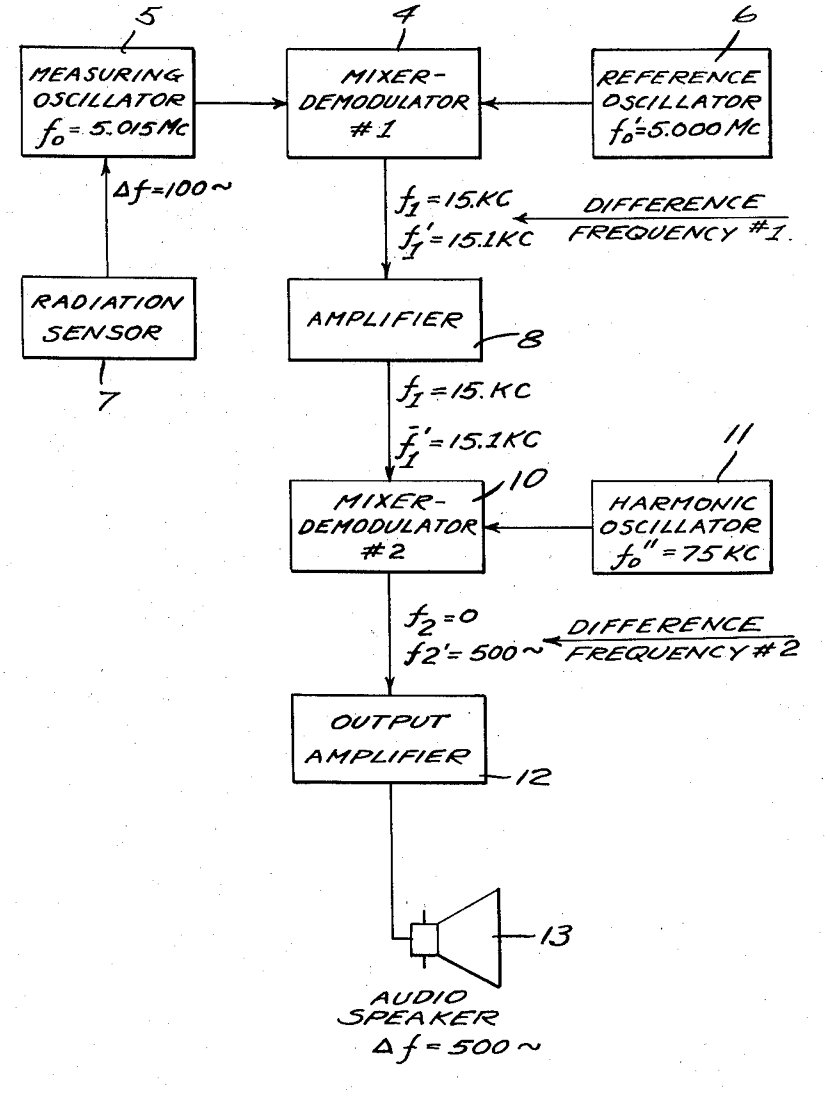
Figure 2:
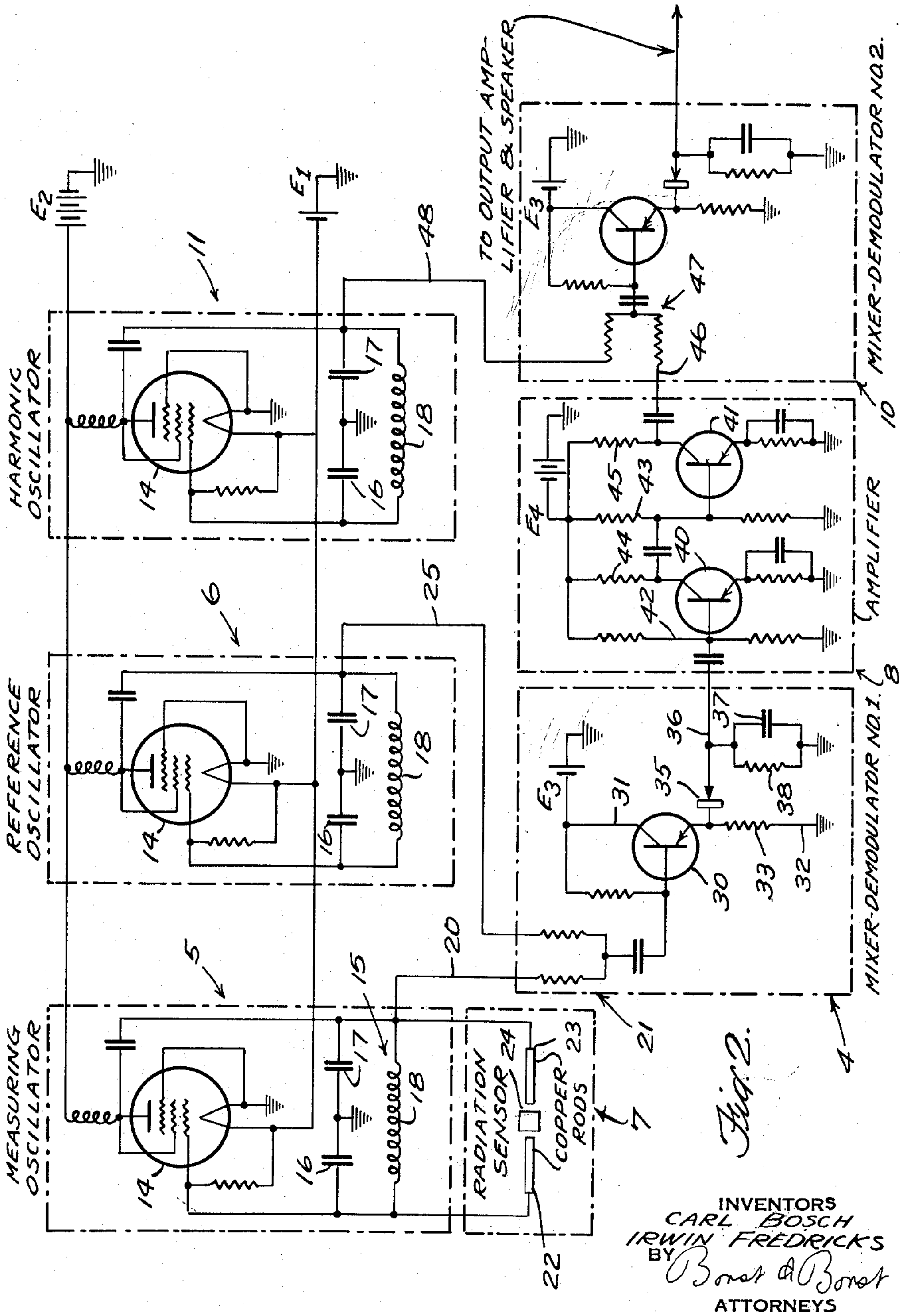

Other objects and advantages of the frequency detector system may be appreciated on reading the following detailed description which is taken in conjunction with the accompanying drawings, in which FIG. 1 is a block diagram illustrating the basic features of the invention, and FIG. 2 is a schematic indicating the essential circuit design of the two-stage frequency detecting device.

As shown in FIG. 1, a frequency mixing and demodulating unit 4 is connected to dual input connections from a measuring oscillator 5 and a reference oscillator 6, respectively. The measuring oscillator frequency is subject to control by the output of radiation sensor 7. The beat output of the mixer-demodulator 4 is amplified by amplifier 8 and introduced to a second frequency mixer-demodulator 10. In the latter unit the beat frequency output of the first-mentioned mixer-demodulator is mixed with the output of an harmonic oscillator 11 and its demodulated output represents a second difference frequency which is amplified in the output amplifier 12 and conveyed to an audio speaker 13. As pointed out below, the normal frequencies of the measuring oscillator 5 and the reference oscillator 6 are such that when a given harmonic of their difference frequency is mixed with the output of the harmonic oscillator 11, there will be no audio indication in the speaker 13. On the other hand, any radiation applied to the radiation sensor control of the measuring oscillator 5 will appear as a frequency in the audio range in the speaker.

Referring to FIG. 2, the measuring oscillator 5 is a Colpitts type oscillator utilizing a subminiature vacuum tube 14 whose filament is heated by the voltage source $E_1$ and the plate electrode is supplied by a second voltage source $E_2$. The control grid of the tube 14 is controlled by one side of tank circuit 15 comprising series connected capacitors 16 and 17 and coil inductor 18 connected parallel thereto. The other side of the tank circuit is connected to the plate of the tube 14 which is connected by output lead 20 to one leg of a summing network 21 which serves as the frequency mixer for the two oscillators in the first stage. The radiation sensor 7 is connected across the tank circuit 15 and comprises a pair of copper rods 22 and 23 which act as fixed plates of a capacitor. A conductor 24 is disposed between the plates and serves as the dielectric for the capacitor. The dielectric is affected by the presence of electromagnetic energy such as infra-red rays. The degree of capacitor response will depend on the amount of infra-red energy to which the dielectric is exposed.

The circuit of the reference oscillator 6 is arranged in the identical manner to that of the measuring oscillator 5, corresponding elements being assigned the same reference numerals, with the exception that there is no sensor to control the frequency of the tank circuit of the oscillator. The output of the reference oscillator on line 25 is introduced to the other leg of the summing network 21 which mixes the frequencies from the two oscillators in the first stage and introduces its mixed frequency output to the base electrode of emitter follower transistor 30 which has a collector circuit 31 biased by voltage source $E_3$ and an emitter circuit 32 which includes a grounded resistor 33. A half wave rectifying diode 35 is connected to the emitter circuit of the transistor at a point between the latter's emitter electrode and the resistor 33 and serves to demodulate the transistor's output thereby producing the desired difference or beat frequency. The demodulated output appearing from lead 36 is filtered by means of a low pass filter comprising capacitor 37 and resistor 38 in shunt therewith which are connected between the lead 36 and ground. The low pass filter acts to eliminate high frequency signals emanating from the oscillators in the first stage of the system thereby permitting the difference frequency signal to be applied to the amplifier 8.

The amplifier 8 includes a pair of cascaded transistors 40 and 41. The base electrodes of the two transistors are supplied by voltage source $E_4$ through dividers 42 and 43, respectively, while their collector electrodes are supplied by the same source through resistors 44 and 45, respectively.

The output of the amplifier 8 carried on collector lead 46 is placed in one leg of the summing network 47 the other leg of which is connected to receive the frequency output on lead 48 from the tank circuit of the harmonic oscillator 11. The circuit arrangement of the harmonic oscillator 11 is identical to that of the reference oscillator 6, the same reference numerals being assigned to the corresponding elements thereof.

The summing network output is placed in the mixing section of the mixer-demodulator 10. The frequency mixer and demodulating components of the unit 10 are arranged identically to those disclosed in the corresponding frequency mixer-demodulator 4, the same reference numerals being assigned to corresponding elements. The output of the frequency mixer-demodulator 10 is amplified in output amplifier 12 and the audio detector and speaker 13 as above mentioned.

By way of example, the measuring oscillator 5 is set to produce a normal frequency of 5.015 megacycles, the reference oscillator to produce 5.000 megacycles and the harmonic oscillator to produce 75 kilocycles. Thus, the frequencies of the two oscillators in the first stage of the detector are set sufficiently apart so that there is no possibility of their being locked together. The detection phase of the mixer-demodulator 10 is arranged so that the fifth harmonic of the amplified beat frequency applied as one input thereto is caused to beat with the output of the 75 kilocycle oscillator 11 whose output is applied as the second input to this unit. Accordingly, the two oscillators in the first stage operate normally to feed a reference frequency $f_0'$ of 5.0 megacycles and the oscillator 5 to feed a normal measuring frequency of $f_0$ of of 5.015 megacycles to the mixer-demodulator 4. The latter unit is thereby caused to yield a difference frequency $f_1$ of 15.0 kilocycles to the amplifier 8 and the mixer-demodulator 10 where it is caused to beat with its fifth harmonic $f_0''$, of 75 kilocycles against the 75 kilocycle output of the harmonic oscillator 11 producing a zero beat frequency $f_2$ to the output amplifier 12 and speaker 13. Assuming that a radiation signal falls on the radiation sensor 7 the frequency of the measuring oscillator is caused to increase say by 100 cycles. This results in a beat frequency $f_1'$ of 15.1 kilocycles being fed to the mixer-demodulator 10. The fifth harmonic of 15.1 kilocycles is 75.5 kilocycles. This fifth harmonic beats with the 75.0 kilocycle output of the harmonic oscillator to produce a second beat frequency $f_2'$ of 500 cycles in the speaker. Thus a change of 100 cycles at the measuring oscillators in effect has been amplified to a 500 cycle change at the speaker resulting in a highly sensitive frequency sensing system.

Various modifications of the invention as described above may be effected by persons skilled in the art without departing from the scope and principle of the invention as defined in the appended claims.

What is claimed is:

1. A two-stage frequency detecting system comprising a frequency mixing and demodulatnig component, a frequency measuring oscillator connected as one input to said component, a reference oscillator connected as a second input to said component, said frequency measuring oscillator being set to generate a normal frequency differing from the frequency of said reference oscillator whereby a difference frequency is normally produced by the component, a radiation sensor disposed in frequency control of said measuring oscillator, a second mixing and demodulating component, said first-mentioned mixing and demodulating component being connected as one input to the second component, a harmonic oscillator connected to introduce its output as a second input to said second component, said harmonic oscillator being set to generate a harmonic frequency of the same value as a harmonic of the normal frequency output of said first-mentioned component and an indicating device disposed in the output of said second component.

2. A two-stage frequency detecting system comprising a frequency mixing and demodulating component, a frequency measuring oscillator connected as one input to said component, a reference oscillator connected as a second input to said component, said reference and measuring oscillators being arranged to produce normal frequencies whose difference is higher than the audio frequency range, a radiation sensor disposed in frequency control of said measuring oscillator, a second mixing and demodulating component, said first-mentioned mixing and demodulating component being connected as one input to the second component, a harmonic oscillator connected to introduce its input to said second component as a second input therefor, said harmonic oscillator being set to generate a harmonic frequency of the same value as a harmonic of the normal difference frequency output of said first-mentioned component and an indicating device disposed in the output of said second component.

3. A two-stage frequency detecting system comprising a frequency mixing and demodulating component, a frequency measuring oscillator connected as one input to said component, a reference oscillator connected as a second input to said component, said frequency measuring oscillator being set to generate a normal frequency differing from the frequency of said reference oscillator whereby a difference frequency is produced by the component, said reference and measuring oscillators being arranged to produce normal sinusoidal frequencies whose difference is higher than the audio frequency range, a radiation sensor disposed in frequency control of said measuring oscillator, a second mixing and demodulating component, said first-mentioned mixing and demodulating component being connected as one input to the second component, a harmonic oscillator connected to introduce its output as a second input to said second component, said harmonic oscillator being set to generate a harmonic frequency of the same value as a harmonic of the normal frequency output of said first-mentioned component and an indicating device disposed in the output of said second component.

4. A two-stage frequency detecting system comprising a frequency mixing and demodulating component, a frequency measuring oscillator connected as one input to said component, a reference oscillator connected as a second input to said component, said reference and measuring oscillators being arranged to produce normal sinusoidal frequencies whose difference is higher than the the audio frequency range, a radiation sensor disposed in frequency control of said measuring oscillator, a second mixing and demodulating component, said first-mentioned mixing and demodulating component being connected as one input to the second component, an amplifier disposed between said mixing and demodulating components, a harmonic oscillator connected to introduce its output as a second input to said second component, said second component being set to beat a relatively high frequency harmonic of its amplified inpuit with the frequency output of said harmonic oscillator normally to produce a zero beat frequency and an indicating device disposed in the output of said second component.

References Cited in the file of this patent

UNITED STATES PATENTS

| | | |
|---|---|---|
| 2,706,251 | Russell et al. | Apr. 12, 1955 |
| 2,976,419 | Menke et al. | Mar. 21, 1961 |

FOREIGN PATENTS

| | | |
|---|---|---|
| 915,931 | France | Nov. 21, 1946 |
| 1,001,279 | France | Feb. 21, 1952 |